United States Patent [19]

Kobayashi et al.

[11] Patent Number: 5,128,301

[45] Date of Patent: Jul. 7, 1992

[54] CATALYST FOR REMOVAL OF NITROGEN OXIDES AND METHOD FOR REMOVAL OF NITROGEN OXIDES BY USE OF THE CATALYST

[75] Inventors: Motonobu Kobayashi; Futoru Kinoshita, both of Himeji; Yoku Nanba, Osaka; Akiras Inoue, Hirakata, all of Japan

[73] Assignee: Nippon Shokubai Kagaku Kogyo Co., Ltd., Osaka, Japan

[21] Appl. No.: 564,448

[22] Filed: Aug. 8, 1990

[30] Foreign Application Priority Data

Aug. 9, 1989 [JP] Japan ................... 1-204607

[51] Int. Cl.$^5$ .................. B01J 21/06; B01J 23/16
[52] U.S. Cl. ................... 502/241; 502/236; 502/239; 502/242
[58] Field of Search ............. 502/236, 239, 242, 244, 502/241; 423/239

[56] References Cited

U.S. PATENT DOCUMENTS

| 4,725,572 | 2/1988 | Sera et al. ............. | 502/236 |
| 4,891,348 | 1/1990 | Imanari et al. .......... | 502/242 |
| 4,929,586 | 5/1990 | Hegedus et al. ......... | 502/236 |
| 4,946,661 | 8/1990 | Tachi et al. ........... | 423/239 |

FOREIGN PATENT DOCUMENTS

| 0258465 | 3/1988 | European Pat. Off. . |
| 0317293 | 5/1989 | European Pat. Off. . |
| 3433197 | 3/1985 | Fed. Rep. of Germany . |
| 54-29419 | 9/1979 | Japan . |

Primary Examiner—Carl F. Dees
Attorney, Agent, or Firm—Omri M. Behr

[57] ABSTRACT

A honeycomb catalyst for effecting catalytic reduction and removal of nitrogen oxides in waste gas in the presence of ammonia, which honeycomb catalyst (I) contains a catalytically active substance comprising 60 to 99.5% by weight of a binary oxide containing titanium and silicon and 40 to 0.5% by weight of the oxide of at least one metal selected from the group consisting of vanadium, tungsten, molybdenum, copper, manganese, cerium, and tin, (II) possesses an opening ratio in the cross section of said catalyst in the range of 80 to 90%, (III) has a thickness of partition walls separating through holes in the range of 0.2 to 0.8 mm, and (IV) possesses pores comprising substantially two independent pore groups each of a uniform pore diameter, such that the pore volume occupied by one pore group having a pore diameter in the range of 0.01 to 0.03 μm accounts for a proportion in the range of 50 to 80% of the total pore volume and the pore volume occupied by the other pore group having a pore diameter in the range of 0.8 to 4 μm accounts for the proportion of the range of 10 to 30% of the total pore volume.

10 Claims, 2 Drawing Sheets

CATALYST FOR REMOVAL OF NITROGEN OXIDES AND METHOD FOR REMOVAL OF NITROGEN OXIDES BY USE OF THE CATALYST

BACKGROUND OF THE INVENTION

1. Field of the Invention

This invention relates to a catalyst for the removal of nitrogen oxides and to a method for the removal of nitrogen oxides by the use of the catalyst. More particularly, it relates to a honeycomb catalyst to be used for the removal of nitrogen oxides contained in waste gases discharged from boilers, heating furnaces, gas turbines, diesel engines, and various industrial processes and to a method for efficient removal of such nitrogen oxides by the use of the catalyst.

2. Description of the Prior Art

In the methods currently available for the removal of nitrogen oxides from waste gases, the method of selective catalytic reduction which attains selective removal of nitrogen oxides even from a waste gas of a high oxygen content, operates effectively with only a small amount of a reducing agent, and allows use of ammonia as a reducing agent by reason of economy has been predominating.

As respects the shape of the catalyst to be used in this method of selective catalytic reduction, the catalyst in the honeycomb construction proves to be effective for the reason that the dust in the waste gas is not readily deposited on the catalyst bed and the pressure loss suffered by the catalyst bed is small. At present, therefore, the honeycomb catalyst is in extensive utility. Concerning the method for effective removal of nitrogen oxides by the use of a honeycomb catalyst, it is disclosed in Japanese Patent Publication SHO 54(1979)-29, 419, for example, that when the through holes in the honeycomb catalyst are so defined as to possess an equivalent diameter in the range of 2 to 30 mm and an opening ratio in the range of 50 to 80% and produces a gas flow rate in the range of 0.5 to 60 m/sec, the honeycomb catalyst experiences no clogging of the through holes with the dust, suffers only from a small pressure loss, and enjoys a high ratio of removal of nitrogen oxides (hereinafter referred to as "nitrogen removal ratio").

In recent years, the environmental pollution with nitrogen oxides represented by the acidic rain has been worsening on the global scale. In the circumstances, an earnest desire has been expressed to perfect as a measure for decreasing the emanation of nitrogen oxides a technique for nitrogen removal waste gases with high efficiency at a low cost. For the sake of this technique, it is extremely important to promote compaction of a nitrogen removal apparatus by decreasing the amount of catalyst required therefor and, at the same time, lower the pressure loss of the catalyst bed to the fullest possible extent and decrease the power consumption required for the operation of a fan.

The method disclosed in Japanese Patent Publication SHO 54(1979)-29, 419 is not enough at all to fulfil the requirement described above. The desirability of developing a catalyst for the removal of nitrogen oxides which possesses a still higher capacity for denitrification and suffers only from a small pressure loss or a method for efficient removal of nitrogen oxides has been finding enthusiastic recognition.

Incidentally, it is widely known that in proportion as the opening ratio in the cross section of a given honeycomb catalyst is increased, the thickness of partition walls separating the through holes is inevitably decreased (hereinafter referred to occasionally as "cell wall thickness") and, as the result, the pressure loss of the catalyst bed is lowered and the geometric surface area of the catalyst is increased, with the result that the nitrogen removal activity is enhanced. For the pressure loss of the catalyst bed to be suppressed to the fullest possible extent, it is necessary that the opening ratio of the catalyst should be increased as much as possible. The present inventors' study has revealed that when the opening ratio of a given catalyst exceeds 80% and, as an inevitable consequence, the cell wall thickness is decreased, the catalyst's nitrogen removal activity is liable to decrease conversely.

An object of the present invention, therefore, is to provide a novel catalyst for the removal of nitrogen oxides and a method for the removal of nitrogen oxides by the use of the catalyst.

Another object of this invention is to provide a honeycomb catalyst to be used for the removal of nitrogen oxides contained in waste gas and a method for efficient removal of the nitrogen oxides by the use of this catalyst.

Yet another object of this invention is to provide a catalyst for the removal of nitrogen oxides which allows ample suppression of pressure loss, excels in the ability to nitrify waste gas, the enjoys highly satisfactory durability and a method for efficient removal of nitrogen oxides by the use of this catalyst.

SUMMARY OF THE INVENTION

These objects are accomplished by a honeycomb catalyst for effecting catalystic reduction and removal of nitrogen oxides in a waste gas in the presence of ammonia, which honeycomb catalyst (I) contains a catalytically active substance comprising 60 to 99.5% by weight of a binary oxide containing titanium and silicon and 40 to 0.5% by weight of the oxide of at least one metal selected from the group consisting of vanadium, tungsten, molybdenum, copper, manganese, cerium, and tin, (II) possesses an opening ratio in the cross section of the catalyst in the range of 80 to 90%, (III) has a thickness of partition walls separating through holes in the range of 0.2 to 0.8 mm, and (IV) possesses pores comprising substantially two independent pore groups each of a uniform pore diameter, such that the pore volume occupied by one pore group having a pore diameter in the range of 0.01 to 0.03 $\mu$m accounts for a proportion in the range of 50 to 80% of the total pore volume and the pore volume occupied by the other pore group having a pore diameter in the range of 0.8 to 4 $\mu$m accounts for a proportion in the range of 10 to 30% of the total pore volume.

These objects are also accomplished by a method for the removal of nitrogen oxides in waste gas, which method comprises causing the waste gas to contact the aforementioned catalyst in the presence of ammonia.

The main effects of the present invention are as follows:

(1) By the use of the honeycomb catalyst of the present invention, the pressure loss of catalyst bed can be lowered conspicuously. As a result, the power consumption required for the operation of a fan can be reduced and the denitrifying process can be appreciably economized.

(2) The honeycomb catalyst of the present invention continues to exhibit high denitrifying activity for a long time.

(3) The honeycomb catalyst of this invention possesses durabulity enough to satisfy commercial applications.

(4) Since the honeycomb catalyst of this invention continues to possess a high nitrogen removal activity for a long time, suffers only from a small pressure loss of catalyst bed, and enjoys thorough durability, it can effect efficient and economic removal of nitrogen oxides in waste gas.

(5) Since the honeycomb catalyst of this invention has as large an opening ratio in the cross section thereof as to exceed 80%, enjoys a light weight, and allows a reduction in the amount of raw materials required for the production of catalyst, it permits a saving in the cost of production of the honeycomb catalyst. As the result, it promises provision of an economical denitrifying process.

EXPLANATION OF THE PREFERRED EMBODIMENT

Figure 1:
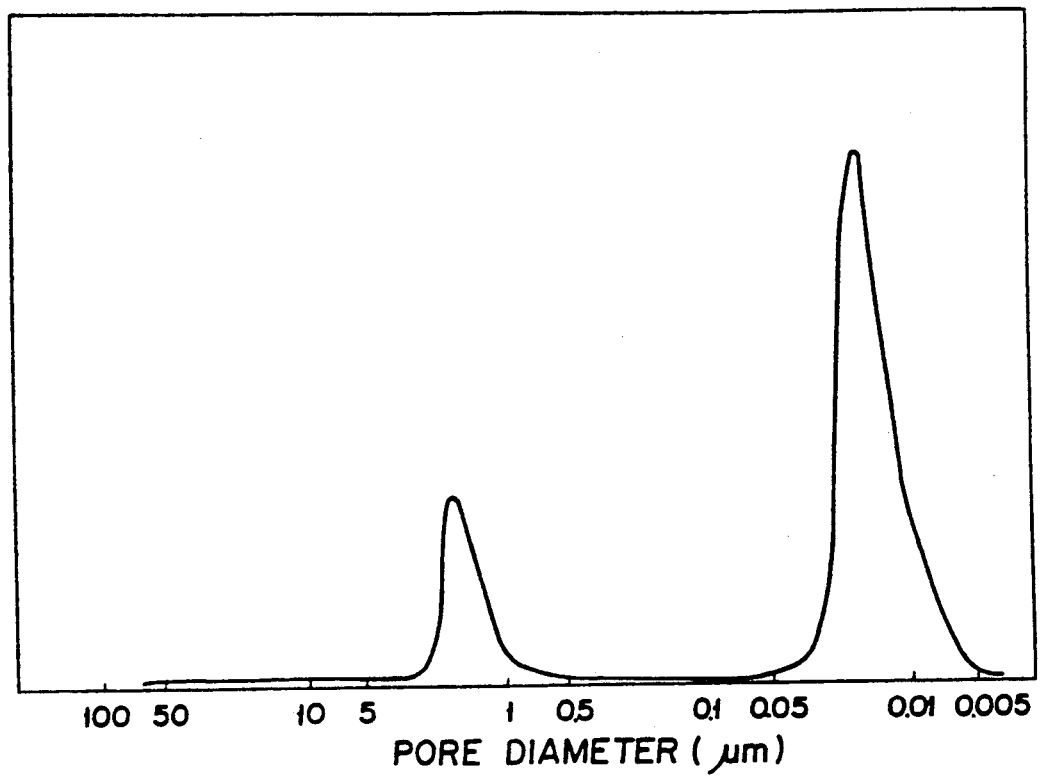
FIG. 1 is a diagram showing the pore diameter distribution of a honeycomb obtained in Example 1.

Now, the present invention will be described in detail below with respect to the components (I) to (IV) sequentially in the order mentioned.

The catalytically active substance for the catalyst of a honeycomb construction of this invention to be used for the removal of nitrogen oxides (hereinafter referred to as "honeycomb catalyst of this invention") comprises (A) 60 to 99.5% by weight of a binary oxide containing titanium and silicon (hereinafter referred to briefly as "$TiO_2$—$SiO_2$") and (B) 40 to 0.5% by weight of the oxide of at least one metal selected from the group consisting of vanadium, tungsten, molybdenum, copper, manganese, cerium, and tin.

In the composition of $TiO_2$—$SiO_2$ as the component (A), titanium is preferable to account for a proportion in the range of 40 to 95% and silicon for a proportion in the range of 60 to 5%, respectively in the atomic percentage. If the proportion of titanium is less than 40%, the nitrogen removal activity of the catalyst is unduly low. If this proportion exceeds 95%, the oxidizing activity of $SO_2$ is unduly high.

The component (B) is the oxide of at least one metal selected from the group consisting of vanadium, tungsten, molybdenum, copper, manganese, cerium, and tin.

The proportion of the component (A) is in the range of 60 to 99.5% by weight, preferably 80 to 99% by weight, and the proportion of (B) is in the range of 40 to 0.5% by weight, preferably 20 to 1% by weight. If the proportion of the component (A) is less than 60% by weight, the cost of raw materials for the catalyst is high and the denitrifying activity cannot be expected to be proportionately increased. Conversely, if this proportion exceeds 99.5% by weight, the undesirability arises that the denitrifying activity is unduly low.

The method for the preparation of the honeycomb catalyst of this invention is not specifically defined. This honeycomb catalyst can be prepared by various methods. Now, a typical method of preparation will be described below. It should be noted, however, that this invention is not limited to this method.

In the preparation of $TiO_2$—$SiO_2$ as the component (A), at least one compound selected from the group consisting of inorganic titanium compounds such as titanium chloride and titanium sulfate and organic titanium compounds such as titanium oxalate and tetraisopropyl titanate can be used as a titanium source and at least one compound selected from the group consisting of inorganic silicon compounds as colloidal silica, finely powered silicic acid, water glass, and silicon tetrachloride and organic silicon compounds such as tetraethyl silicate as a silicon source.

The aforementioned compounds as the titanium source and the silicon source are weighted out in amounts such that the atomic percentages of titanium and silicon fall respectively in the ranges of 40 to 95% and 60 to 5% and they are retained in the state of an acidic aqueous solution or a sol in a concentration in the range of 1 to 100 g/liter, preferably 5 to 80 g/liter, as oxides at a temperature in the range of 10° to 100° C., preferably 10° to 50° C. The mixture of the compounds is stirred and aqua ammonia is added dropwise thereto as a neutralizing agent to give rise to a coprecipitated compound. The coprecipitated compound is separated by filtration, thoroughly washed, then dried by heating at a temperature in the range of 80° to 140° C., preferably 100° to 120° C., for a period in the range of 1 to 10 hours, preferably 5 to 10 hours, and further calcined at a temperature in the range of 450° to 700° C., preferably 500° to 650° C., for a period in the range of 1 to 10 hours, preferably 3 to 10 hours, to obtain $TiO_2$—$SiO_2$.

In the preparation of the oxide of at least one metal selected from the group consisting of vanadium, tungsten, molybdenum, copper, manganese, cerium, and tin as the component (B), the starting material may be suitably selected from among oxides, hydroxides, ammonium salts, oxalates, and halides of the metals mentioned above. Specifically, the vanadium sources which are usable herein include ammonium metavanadate, vanadyl sulfate, vanadyl oxalate, and vanadium oxide and the tungsten sources which are usable herein include tungsten oxide, ammonium paratungstate, and tungstic acid, for example.

The aforementioned component (A) and the aqueous solution of a starting material for the component (B) added thereto in conjunction with a molding auxiliary are mixed, kneaded, and molded in the form of a honeycomb with an extrusion molding device. From the molded product, a honeycomb catalyst of the present invention is obtained by drying the molded product at a temperature in the range of 50° to 120° C., preferably 50° to 100° C., and then calcining the dried product in the air at a temperature in the range of 450° to 700° C., preferably 500° to 650° C., for a period in the range of 1 to 10 hours, preferably 2 to 6 hours.

The specific surface area (BET surface area) of the honeycomb catalyst of the present invention is preferable to be not less than 80 m²/g, preferably in the range of 80 to 250 m²/g.

The opening ratio in the cross section (cross section perpendicular to the through holes) of the honeycomb catalyst of the present invention is preferable to be in the range of 80 to 90%, preferably 80 to 88%. In the present invention, an economic effect is obtained as in lowering the pressure loss of the catalyst bed as described above and decreasing the power consumption required for the operation of a fan by allowing the catalyst to have an opening ratio of not less than 80% in the cross section thereof. If the opening ratio in the cross section exceeds 90%, the catalyst no longer has practicability because the cell walls have a very small thickness and the strenght of the catalyst is unduly low.

The thickness of the partition walls separating the through holes in the honeycomb catalyst of this invention is in the range of 0.2 to 0.8 mm, preferably 0.2 to 0.7 mm. If this thickness is less than 0.2 mm, the strength is unduly low. Conversely, if the thickness exceeds 0.8 mm, the undesirability arises that the pressure loss is unduly large.

The through holes in the honeycomb catalyst of this invention have diameters in the range of 2 to 8 mm, preferably 3 to 7 mm.

The honeycomb catalyst of this invention possesses pores comprising substantially two independent pore groups each of a uniform pore diameter, such that the pore volume occupied by one pore group having a pore diameter in the range of 0.01 to 0.03 $\mu$m accounts for a proportion in the range of 50 to 80%, preferably 50 to 70% of the total pore volume and the pore volume occupied by the other pore group having a pore diameter in the range of 0.8 to 4 $\mu$m accounts for a proportion in the range of 10 to 30%, preferably 15 to 30% of the total pore volume. Specifically, the honeycomb catalyst of this invention is characterized by the fact that, as illustrated in FIG. 1, the two pore groups are present independently of each other and exhibit very sharp pore diameter distributions.

Figure 2:
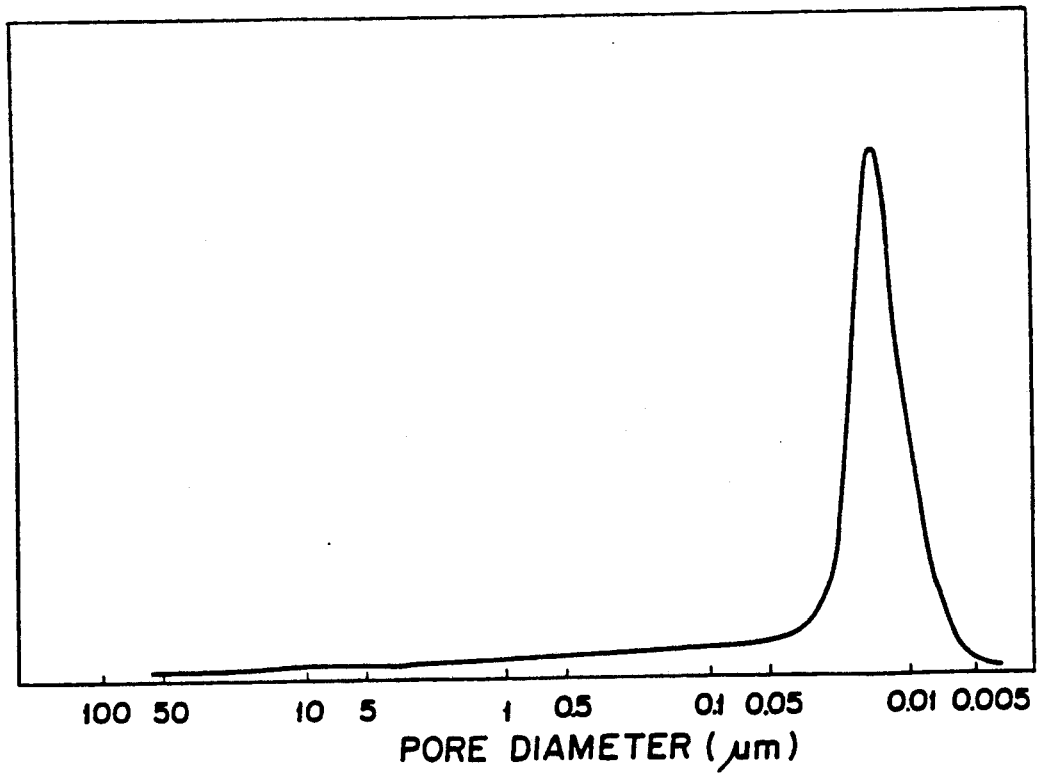
FIG. 2 is a diagram showing the pore diameter distribution of a catalyst obtained in Control 1.
Figure 3:
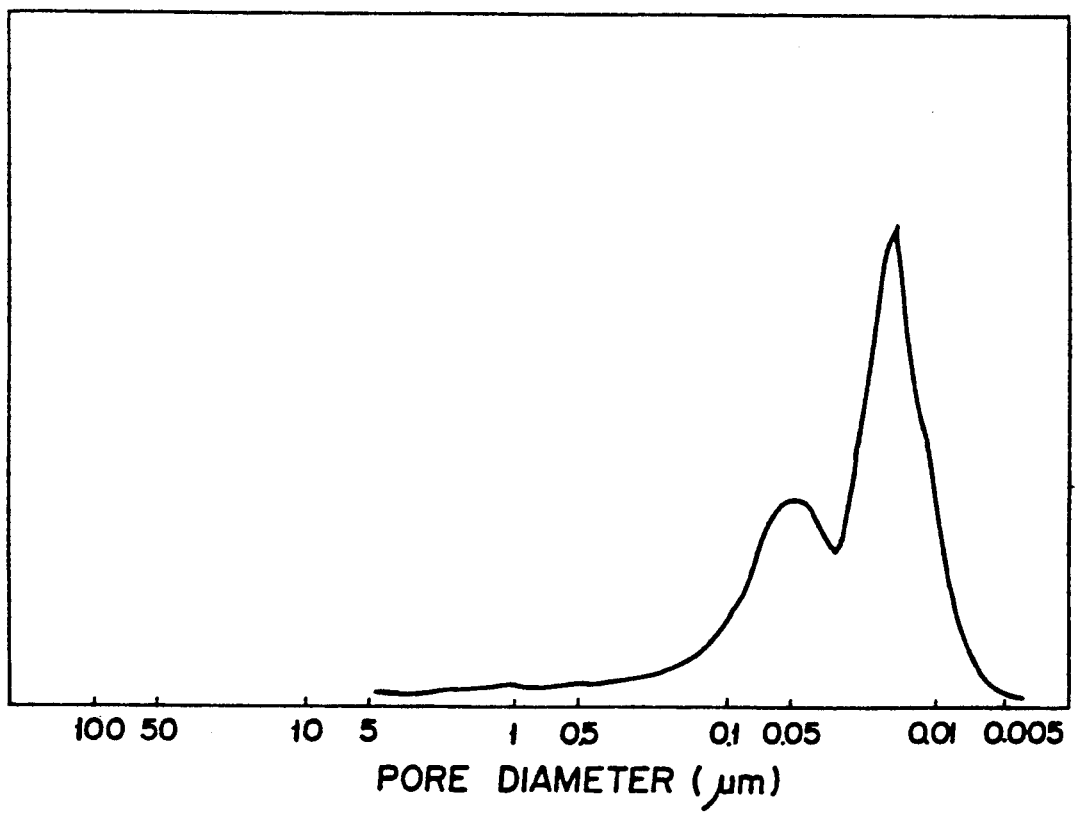
FIG. 3 is a diagram showing the pore diameter distribution of a catalyst obtained in Control 2.

If the pores form one pore group as illustrated in FIG. 2 or if the pores form no two independent pore groups, partly overlap one another, and possess no uniform pore diameter as illustrated in FIG. 3, the objects of this invention are not accomplished.

The fact that the pore groups exhibit very sharp pore diameter distributions in the honeycomb catalyst of this invention means that the two pore groups are each formed of pores of a highly uniform diameter and this very fact is believed to explain why the honeycomb catalyst of this invention exhibits high satisfactory denitrifying activity. Specifically, the true cause remains yet to be elucidated definitely. When a waste gas is to be diffused within pores of a catalyst, the diffusion of the waste gas proceeds easily in the pore groups each having a uniform diameter as in the honeycomb catalyst of this invention. As the result, it is believed that even when the cell walls have a small thickness, the honeycomb catalyst is improved in denitrifying activity without reference to the cell wall thickness.

The total pore volume of the honeycomb catalyst of this invention is preferable to be in the range of 0.3 to 0.55 cc/g.

The pore diameter, pore diameter distribution, and pore volume of the honeycomb catalyst of this invention have been determined by the use of a mercury injection type porosimeter.

The honeycomb catalyst possessing pores comprising two independent pore groups each having a uniform diameter according with the present invention can be produced by (1) a method which comprises adding during the course of molding an organic polymeric compound such as resin or cellulose or an inorganic salt such as ammonium nitrate which is volatilized and decomposed in the step of calcination, (2) a method which comprises adding a powder such as silica sand, $\alpha$-alumina, cordierite, or zirconia and mixing the powder with the raw materials, or (3) a method which comprises suitably adjusting the particle diameter of the raw material powders, for example.

Typically, the organic polymeric compounds which are usable in the method of (1) include polyethylene resin, acrylic resin, and crystalline cellulose, for example. Typically, the inorganic salts which are similarly usable herein include ammonium nitrate, ammonium oxalate, and ammonium carbonate, for example. The amount of such a polymeric compound to be added is in the range of 5 to 30% by weight, preferably 10 to 30% by weight.

The average particle diameter and the amount of addition of the powder in the method of (2) are desired to be respectively in the range of 1 to 20 $\mu$m, preferably 5 to 20 $\mu$m, and in the range of 5 to 30%, preferably 10 to 30%.

In the case of the method of (3), the average particle diameter of the powder as a raw material is generally in the range of 2 to 30 $\mu$m, preferably 5 to 20 $\mu$m. If the particle diameter is unduly small, the honeycomb catalyst possessing pore distributions aimed at by this invention cannot be prepared.

The kind of the waste gas to be treated with the honeycomb catalyst of this invention is not specifically defined. The honeycomb catalyst of the present invention can be used for the removal of nitrogen oxides contained in waste gases discharged from boilers, heating furnaces, gas turbines, diesel engines, and various industrial processes.

Specifically, it can be effectively used for a waste gas approximately containing 0 to 3,000 ppm of sulfur oxides ($SO_x$), 1 to 20% by volume of oxygen, 1 to 15% by volume of carbon dioxide, 5 to 15% by volume of steam, 0 to 30 g/$Nm^3$ of soot, and 100 to 1,000 ppm of nitrogen oxides ($NO_x$, mainly NO). The waste gas from the ordinary boiler has a gas composition falling in the aforementioned ranges. The honeycomb catalyst of the present invention can be also used for the treatment of such special gases as nitrogen oxides-containing waste gases containing no sulfur oxide and nitrogen oxides-containing waste gases containing halogen compounds.

Though the conditions of the treatment are variable with the kind, behavior, etc. of a given waste gas, the honeycomb catalyst is generally used in an amount in the range of 0.5 to 3 parts by volume, preferably 0.5 to 1.1 parts by volume, based on 1 part by volume of ammonia ($NH_3$). In the case of a waste gas from a boiler, for example, since the $NO_x$ is formed mostly of NO, the molar ratio of NO to $NH_3$ is desired to be approximately in the range of 1:1. This is because the otherwise possible release of any excess $NH_3$ in its unaltered form into the ambient air must be avoided. Where the occurrence of unaltered $NH_3$ must be curbed to the fullest possible extent, it is desirable to lower the molar ratio of $NH_3/NO_x$ below 1:1.

For the purpose of decreasing the pressure loss, the flow speed of the waste gas is desired to be as low as permissible. If the flow speed is less than 1 m/sec, however, the undesirability arises that the catalyst bed is clogged with soot or dust contained in the waste gas. From the practical point of view, therefore, the flow speed of the waste gas is suitably selected in the range of 1 to 20 m/sec, preferably 2 to 10 m/sec. The flow speed in this range is preferable because the low pressure loss aimed at by the present invention can be obtained. The reaction temperature is generally in the range of 200° to 700° C., preferably 250° to 600° C. The special velocity is generally in the range of 1,000 to 100,000 hr$^{-1}$, preferably 3,000 to 20,000 hr$^{-1}$. Though the pressure is not specifically defined, it is desired to be in the range of 0.01 to 10 kg/cm$^2$, preferably 0.5 to 2 kg/cm$^2$. The type of the reaction vessel is not specifically defined. Generally, there may be used reaction vessels of the fixed-bed type, moving-bed type, fluidized-bed type, etc.

Now, the present invention will be described more specifically below with reference to working examples.

EXAMPLE 1

[Preparation of component A]

As a titanium source, an aqueous sulfuric acid solution containing titanyl sulfate and having the following composition was used.

| | |
|---|---|
| TiOSO$_4$ | 250 g/l (as TiO$_2$) |
| Whole H$_2$SO$_4$ | 1,100 g/l |

Separately, 286 liters of aqua ammonia (NH$_3$, 25%) was added to 400 liters of water and 24 kg of silica sol (containing about 30% by weight of SiO$_2$) (produced by Nissan Chemical Co., Ltd. and marketed under trademark designation of "Snowtex NCS-30)"" was also added. Into the resultant solution, a titanium-containing aqueous sulfuric acid solution obtained by diluting 153 liters of the aforementioned aqueous sulfuric acid solution of titanyl sulfate with 300 liters of water was gradually added in a stirred state, to form a coprecipitate. The reaction mixture was left standing in the ensuant state for 15 hours, to obtain a TiO$_2$—SiO$_2$ gel. This gel was separated by filtration, washed with water, and dried at 200° C. for 10 hours.

Then, the dried gel was calcined at 600° C. for 6 hours, pulverized with a hammer mill, and classified with a classifier, to obtain a powder having an average particle diameter of 10 μm.

The composition of the produced powder (hereinafter referred to as "TS-1") was Ti:Si=4:1 (atomic ratio) and the BET surface area was 160 m$^2$/g.

[Preparation of honeycomb catalyst]

Then, 0.45 liter of monoethanolamine was mixed with 4.5 liters of water and, in the resultant solution, 0.907 kg of ammonium paratungstate was dissolved and subsequently 0.444 kg of ammonium metavanadate was dissolved therein, to produce a homogenous solution. This solution and 10 kg of the aforementioned TS-1 were thoroughly mixed under continued addition of a suitable amount of water, kneaded, and then molded with an extrusion molding device to produce a grating the square of 50 mm of visible surface area, 84.6% of opening ratio, 6.9 mm of mesh, and 0.5 mm of cell wall thickness. The grating was dried at 60° C. and then calcined under a current of air at 500° C. for 5 hours.

The composition of the produced honeycomb catalyst, expressed in the weight ratio of oxides, was TS-1: V$_2$O$_5$: WO$_3$-87.3:7. The pore volume of the first pore group and the second pore group having pore diameters respectively in the range of 0.01 to 0.03 μm and in the range of 0.8 to 4 μm accounted respectively for 68% and 18% of the total pore volume. The total pore volume was 0.44 cc/g.

The pore diameter distribution of the honeycomb catalyst thus obtained was determined with a mercury injection type porosimeter (produced by Shimadzu Ltd.). The results are shown in FIG. 1.

It is noted from FIG. 1 that the honeycomb catalyst possessed pores comprising two independent pore groups each having a uniform pore diameter.

[Evaluation of quality of honeycomb catalyst]

A reaction vessel was packed with the honeycomb catalyst and a model gas indicated hereinbelow was supplied thereto under the conditions of 380° C. of reaction temperature, 25 Nm$^3$/m$^2$H (AV) of gas volume per gas contact surface area of the catalyst, and 6 m/sec (380° C.) of flow speed of gas per cross section of the catalyst to determine the denitrification ratio and the pressure loss (per 1 m).

The denitification ratio and the pressure loss were determined as follows.

Nitrogen removal ratio: This property was found by measuring the NO$_x$ concentrations at the inlet and outlet of the catalyst bed with a NO$_x$ meter of the chemical light emission type (produced by Yanagimoto Seisakujo) and performing a calculation in accordance with the following formula:

Nitrogen removal ration (%) = [(NO$_x$ concentration at inlet) −

(NO$_x$ concentration at outlet)]/(NO$_x$ concentration at inlet) × 100

Pressure loss: This property was found by measuring the pressure difference between the inlet and outlet of the catalyst bed and reducing the found pressure difference to a value per m.

The results are shown in Table 1.

| Model gas composition | |
|---|---|
| NO | 800 ppm |
| O$_2$ | 4% |
| SO$_2$ | 1000 ppm |
| H$_2$O | 10% |
| NH$_3$ | 800 ppm |
| N$_2$ | Balance |

EXAMPLES 2 to 5

Honeycomb catalysts possessing varied opening ratios and cell wall thickness were obtained by following the procedure of Example 1 and were tested for denitrification ratio and pressure loss in the same manner as in Example 1. The results are shown in Table 1.

Control 1

The TS-1 powder obtained in Example 1 was further pulverized with an air-current type pulverizing device to obtain a powder having an average particle diameter of 1 μm. From this powder, a honeycomb catalyst having an opening ratio of 62.4%, a cell wall thickness of 1.0 mm, and a mesh of 3.95 mm was prepared by following the procedure of Example 1.

This honeycomb catalyst possessed a total pore volume of 0.40 cc/g and contained pores of only one pore group having inner diameters in the range of 0.01 to 0.03 um as illustrated in FIG. 2. The pore volume occupied by these pores accounted for 90% of the total pore volume.

This honeycomb catalyst was tested for denitrification ratio and pressure loss in the same manner as in Example 1. The results are shown in Table 1.

Control 2

A honeycomb catalyst was prepared by following the procedure of Control 1, excepting titanium oxide ($TiO_2$) having a specific surface area of 50 m$^2$/g was added in an amount to give a TS-1:$TiO_2$ = 10:2 (weight ratio) in the molding of the catalyst.

The honeycomb catalyst thus obtained possessed a total pore volume of 0.38 cc/g and contained two pore groups partially overlapping and having no uniform diameter as illustrated in FIG. 3.

This honeycomb catalyst was tested for denitrification ratio and pressure loss in the same manner as in Example 1. The results are shown in Table 1.

TABLE 1

|  | Shape of honeycomb catalyst | | | Total pore vaolume (cc/g) | Pore diameter distribution | | Nitrogen removal ration (%) | Pressure loss (mm H$_2$O/m) |
|---|---|---|---|---|---|---|---|---|
|  | Opening ratio (%) | Cell wall thickness (mm) | Mesh (mm) |  | Volume of first pore group (%)* | Volume of second pore group (%)* |  |  |
| Example 1 | 84.6 | 0.5 | 6.9 | 0.44 | 68 | 18 | 87.0 | 11 |
| Example 2 | 81.0 | 0.45 | 4.5 | 0.45 | 72 | 16 | 88.7 | 34 |
| Example 3 | 84.6 | 0.35 | 4.6 | 0.42 | 65 | 21 | 88.6 | 31 |
| Example 4 | 88.3 | 0.25 | 4.7 | 0.43 | 67 | 20 | 87.1 | 28 |
| Example 5 | 87.1 | 0.2 | 3.5 | 0.45 | 65 | 21 | 87.1 | 53 |
| Control 1 | 62.4 | 1.0 | 3.95 | 0.41 | 90 | — | 82.0 | 60 |
| Control 2 | 62.4 | 1.0 | 3.95 | 0.38 | 34 | — | 82.0 | 60 |

*Volume of first pore group: This represents the ratio of the volume occupied by the first pore group having inner diameters in the range of 0.01 to 0.03 μm to the total pore volume.
Volume of second pore group: This represents the ratio of the volume occupied by the second pore group having inner diameters in the range of 0.8 to 3 μm to the total pore volume.

What is claimed is:

1. A honeycomb catalyst for effecting catalytic reduction and removal of nitrogen oxides in waste gas in the presence of ammonia, which honeycomb catalyst (I) contains a catalytically active substance comprising 60 to 99.5% by weight of a binary oxide containing titanium and silicon and 40 to 0.5% by weight of the oxide of at least one metal selected from the group consisting of vanadium, tungsten, molybdenum, copper, manganese, cerium, and tin, (II) possesses an opening ratio in the cross section of said catalyst in the range of 80 to 90%, (III) has a thickness of partition walls separating through holes in the range of 0.2 to 0.8 mm, and (IV) possesses pores comprising substantially two independent pore groups each of a uniform pore diameter, such that the pore volume occupied by one pore group having a pore diameter in the range of 0.01 to 0.03 μm accounts for a proportion in the range of 50 to 80% of the total pore volume and the pore volume occupied by the other pore group having a pore diameter in the range of 0.8 to 4 μm accounts for a proportion in the range of 10 to 30% of the total pore volume.

2. A catalyst according to claim 1, wherein said through holes possess diameters in the range of 2 to 8 mm.

3. A catalyst according to claim 1, wherein said binary oxide containing titanium and silicon comprises 40 to 95 atomic % of titanium and 60 to 5 atomic % of silicon.

4. A catalyst according to claim 1, wherein said binary oxide containing titanium and silicon accounts for a proportion in the range of 80 to 99% by weight and the oxide of at least one metal selected from the group consisting of vanadium, tungsten, molybdenum, copper, manganese, cerium, and tin for a proportion in the range of 20 to 1% by weight.

5. A catalyst according to claim 1, wherein the opening ratio in the cross section thereof is in the range of 80 to 88%.

6. A catalyst according to claim 1, wherein the specific surface area is not less than 80 m$^2$/g.

7. A honeycomb catalyst for effecting catalytic reduction and removal of nitrogen oxides in waste gas in the presence of ammonia, which honeycomb catalyst contains a catalytically active substance comprising 60 to 99.5% by weight of a binary oxide containing titanium and silicon and 40 to 0.5% by weight of the oxide of at least one metal selected from the group consisting of vanadium, tungsten, molybdenum, copper, manganese, cerium and tin, and possesses pores comprising substantially two independent pore groups each of a uniform pore diameter, such that the pore volume occupied by one pore group having a pore diameter in the range of 0.01 to 0.03 micron accounts for a proportion in the range of 50 to 80% of the total pore volume and the pore volume occupied by the other pore group having a pore diameter in the range of 0.8 to 4 microns accounts for a proportion in the range of 10 to 30% of the total pore volume.

8. A catalyst according to claim 7, wherein said binary oxide containing titanium and silicon comprises 40 to 95 atomic % of titanium and 60 to 5 atomic % of silicon.

9. A catalyst according to claim 7, wherein said binary oxide containing titanium and silicon accounts for a proportion in the range of 80 to 99% by weight and the oxide of at least one metal selected from the group consisting of vanadium, tungsten, molybdenum, copper, manganese, cerium, and tin for a proportion in the range of 20 to 1% by weight.

10. A catalyst according to claim 7, wherein the specific surface area is not less that 80 m$^2$/g.

* * * * *